USOO5751603A

United States Patent [19]
Landolf

[11] Patent Number: 5,751,603
[45] Date of Patent: May 12, 1998

[54] ASYMMETRICAL POWER SUPPLY

[75] Inventor: David E. Landolf, Beaverton, Oreg.

[73] Assignee: Intel Corporation, Santa Clara, Calif.

[21] Appl. No.: 570,908

[22] Filed: Dec. 12, 1995

[51] Int. Cl.⁶ .................................................. G06F 01/26
[52] U.S. Cl. ................................... 364/492; 324/416
[58] Field of Search ........................... 364/492; 323/243, 323/269, 274; 324/416; 320/9, 29

[56] References Cited

U.S. PATENT DOCUMENTS

| | | | |
|---|---|---|---|
| 3,702,434 | 11/1972 | Ryan | 323/282 |
| 3,787,757 | 1/1974 | Sheug | 323/275 |
| 5,444,298 | 8/1995 | Schutz | 257/691 |
| 5,563,838 | 10/1996 | Mart et al. | 365/226 |

*Primary Examiner*—James P. Trammell
*Assistant Examiner*—Thomas Peeso
*Attorney, Agent, or Firm*—Blakely, Sokoloff, Taylor & Zafman

[57] ABSTRACT

An active asymmetrical power supply comprising a power supply, a load sensor and a voltage reference selection circuit. The load current sensor preferably, is coupled between the power supply and a load to provide the voltage reference selection circuit information regarding the amount of load current being applied to the load. The load current can be measured as a function of a voltage drop across the load current sensor. The voltage reference selection circuit actively offsets an operating voltage (or DC set voltage) in response to the amount of load current being applied to the load.

30 Claims, 4 Drawing Sheets

ASYMMETRICAL POWER SUPPLY

BACKGROUND OF THE INVENTION

1. Field of the Invention

The present invention relates to the field of electronic devices. More particularly, the present invention relates to an active asymmetrical power supply.

2. Description of Art Related to the Invention

It is well known that certain power supplies implemented within an electronic system (e.g., computer, peripheral input/output ("I/O") device, etc.) provide power, namely both voltage and current, to components of the electronic system. These power supplies are configured to convert an input voltage into a desired direct current ("DC") output voltage. In those instances where the input voltage is a DC voltage, the power supplies may be DC—DC converters such as linear voltage regulators or switching voltage regulators which are often preferred over linear voltage regulators due to their superior efficiency and lesser heat dissipation requirements.

In any implementation, a DC—DC converter is designed to keep a "load" within specific voltage limits for a range of load (or output) current, temperature and input voltage. Typically, the load needs to be kept within a relatively narrow predetermined voltage range in order to guarantee it's correct operation. The predetermined voltage range is defined by a maximum threshold voltage ("$V_{max}$") and a minimum threshold voltage ("$V_{min}$"). In order to account for both positive and negative voltage swings, the power supplies may be configured with an operating voltage ("DC set voltage") as an average of these threshold voltages. Thus, an equal voltage margin to account for positive and negative voltage swings is provided. It is contemplated, however, that the DC set voltage may not be set at the average to provide an equal voltage margin if the regulator, load and/or circuit elements such as connection wires, discrete logic, voltage planes and the like respond better in either a positive or negative swing direction.

Referring to FIG. 1, a conventional on-board power supply such as a switching regulator supplying power coupled to a load is shown. The power supply 10 (e.g., a regulator) receives an input voltage ("$V_{in}$") and produces a DC output voltage ("$V_{out}$") as its DC set voltage. $V_{out}$ is provided to a "predictable" load 20 through at least one "POWER" signal line 15. The load 20 may include any electrical circuit or any electronic device including a microprocessor. The power supply 10 is further coupled to the load 20 via a load sense line 25 (hereinafter referred to as the "SENSE" line). The SENSE line 25 notifies the power supply 10 of any variations in $V_{out}$. As a result, as the voltage needs for the load 20 change, the SENSE line 25 notifies the power supply 10 to make certain adjustments in order to generally maintain a fairly constant $V_{out}$.

Likewise, the load 20 normally supports a strict load current ranging from a maximum current ("$i_{max}$") and a minimum current ("$i_{min}$") in which $V_{out}$ is a function of this load current. Thus, if the load current suddenly increases (i.e., a sudden low-to-high current requirement transition at the load 20 takes place), it will cause $V_{out}$ to fall for a short period of time. Conversely, a high-to-low current requirement transition will cause $V_{out}$ to rise for a short time period. These voltage changes are partly due to resistive and inductive effects of "transient" circuit elements such as wires, voltage planes, device pins and non-ideal capacitors. Moreover, they may be partly due to the load 20 disabling one or more of its internal functional units (including clocks) either automatically or under software control when that functional unit is detected by the load 20 to be residing in an "idle" state for a predetermined period of time. For example, if the load 20 is a high-speed microprocessor under Advanced Power Management ("APM") software control, the load 20 may exist in one of a number of power states including a low power "sleep" state which requires a small amount of current of approximately "$i_{min}$". However, in order to "wake-up" the microprocessor, a large amount of current (e.g., approximately "$i_{max}$") may be required to simultaneously turn-on certain internal circuitry within the microprocessor.

Under certain conditions such as described above when the load 20 is a microprocessor having a high-clock speed, the current requirement transition will likely occur faster than the response time of the power supply 10. As a result, the power supply 10 will drive $V_{out}$ in a direction opposite to the direction of the current requirement transition until the power supply 10 can respond. To avoid this problem for sudden low-to-high current transitions, low resistance, low tolerance capacitors are arranged in parallel to decrease their effective internal resistances since these capacitors would provide current more quickly than the power supply 10. Unfortunately, these capacitors are expensive and difficult to obtain an adequate supply, take up additional board space, require additional manufacturing time to implement and may lead to a greater board failure rate.

In effect, this conventional power supply affords a number of disadvantages. One disadvantage is that a large amount of capacitance at the load is required. This increases the overall costs of the motherboard and other disadvantages listed above. Another disadvantage is that the power supply is incapable of actively adjusting the voltage margin to account for large fluctuations of current to guarantee that the voltage applied to the load remains in its predetermined voltage range. Hence, it would be beneficial to create an apparatus and method which overcomes these disadvantages.

SUMMARY OF THE INVENTION

The present invention relates to an active asymmetric power supply which adjusts its voltage margins based on the amount of load current supplied to a predictable load. In a preferred embodiment, the asymmetric power supply comprises a power supply, a load sensor and a voltage reference selection circuit. In its preferred embodiment, the load current sensor is coupled to the power supply and the load to provide the voltage reference selection circuit information regarding the amount of load current being applied to the load. The load current can be measured as a function of a voltage drop across the load current sensor. The voltage reference selection circuit actively offsets an operating voltage (or DC set voltage) in response to the amount of load current being applied to the load.

BRIEF DESCRIPTION OF THE DRAWINGS

The features and advantages of the present invention will be apparent from the following detailed description of the invention in which.

DETAILED DESCRIPTION OF THE INVENTION

An apparatus and method for adjusting power supply voltage based on variations in load current is described herein. In order to provide a thorough understanding of the invention, certain specific details are set forth, such as resistances and the like. It will be evident, however, to those skilled in the art that these specific resistive values illustrate one of a number of embodiments that could be utilized by the present invention. In other instances, well known circuits have not been shown or described in detail in order to avoid unnecessarily obscuring the invention.

Figure 2:
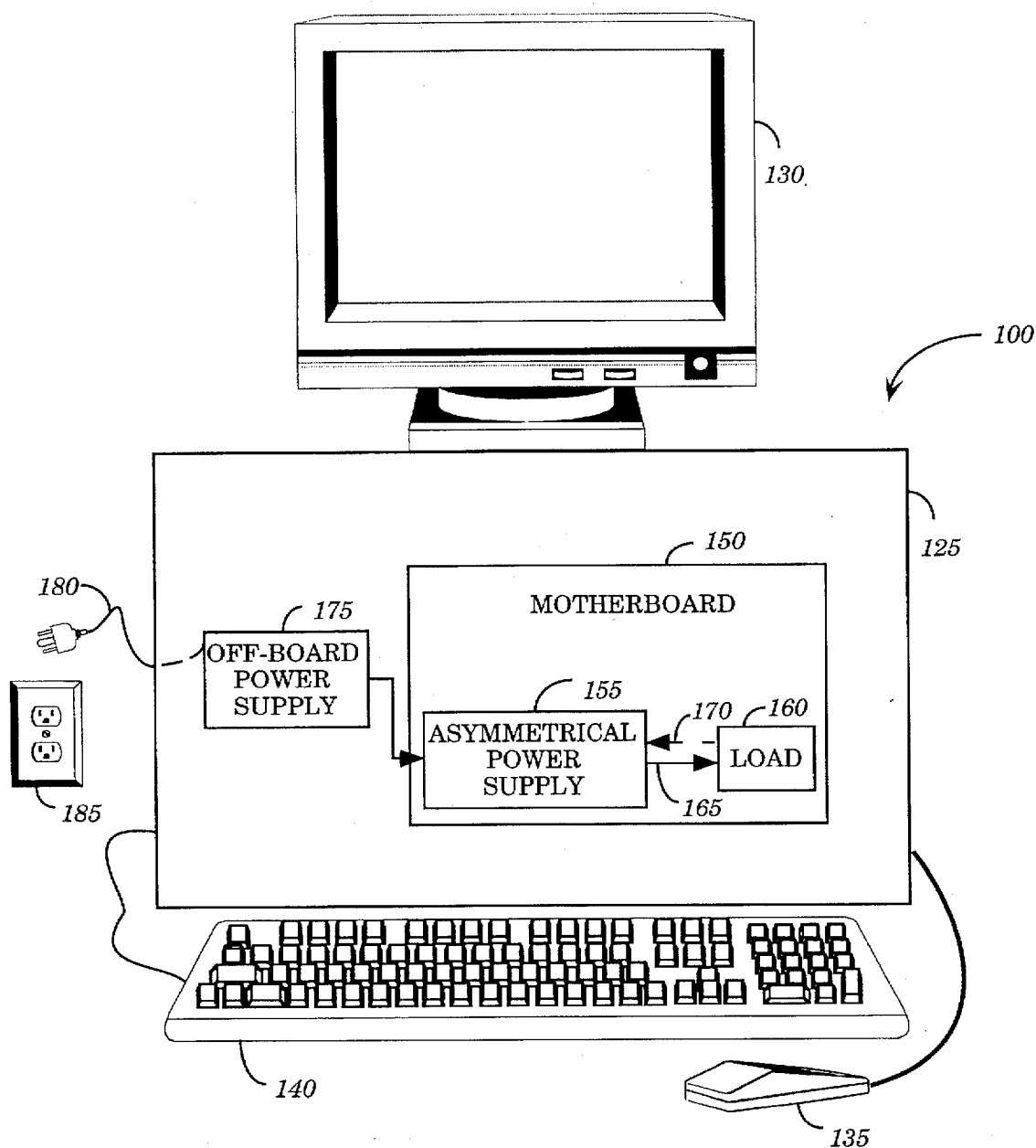
FIG. 2 is a system diagram of a computer system employing an asymmetric power supply.

Referring to FIG. 2, an illustrative embodiment of a general computer system incorporating the present invention is shown. The computer system 100 includes a chassis 125 housing a number of circuit boards including a motherboard 150 coupled to an off-board power supply 175, which receives AC power from a wall socket 185 via a power cord 180. The computer further includes a monitor 130, a cursor control device 135 and an alphanumeric keyboard 140, all of which are coupled to the chassis 125. It is contemplated that other peripherals (e.g., printers, plotters, modems, networks and the like), which are not shown, may be coupled to the computer system 100.

As briefly mentioned above, the off-board power supply 175 receives AC power from the wall socket and produces DC power including DC voltages of ±12 volts, ±5 volts and ground. These voltages are supplied to the motherboard 150 for use by electronic components connected thereto. An asymmetrical power supply 155 receives a DC voltage (e.g., 5 volts) and converts the DC voltage into a voltage required by its load 160. It is contemplated that the load 160 may include any circuit or electronic component, including a processor. The asymmetrical power supply 155 is preferably coupled in close proximity to the load 160 via a power line or trace 165 to reduce the resistance and inductance effect of the power line 165. While the asymmetrical power supply 155 is currently located on the motherboard 150, at least its regulator and regulator control circuitry could be implemented off-board or mounted onto the load 160 to conserve board space.

Figure 1:
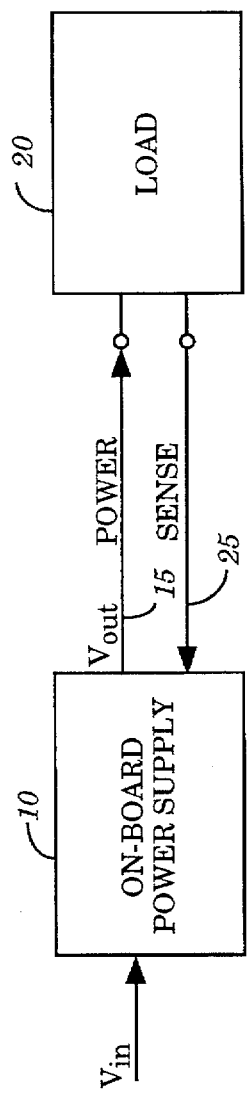
FIG. 1 is a block diagram of a conventional power supply sensing changes in voltage requirements for a load.
Figure 3:
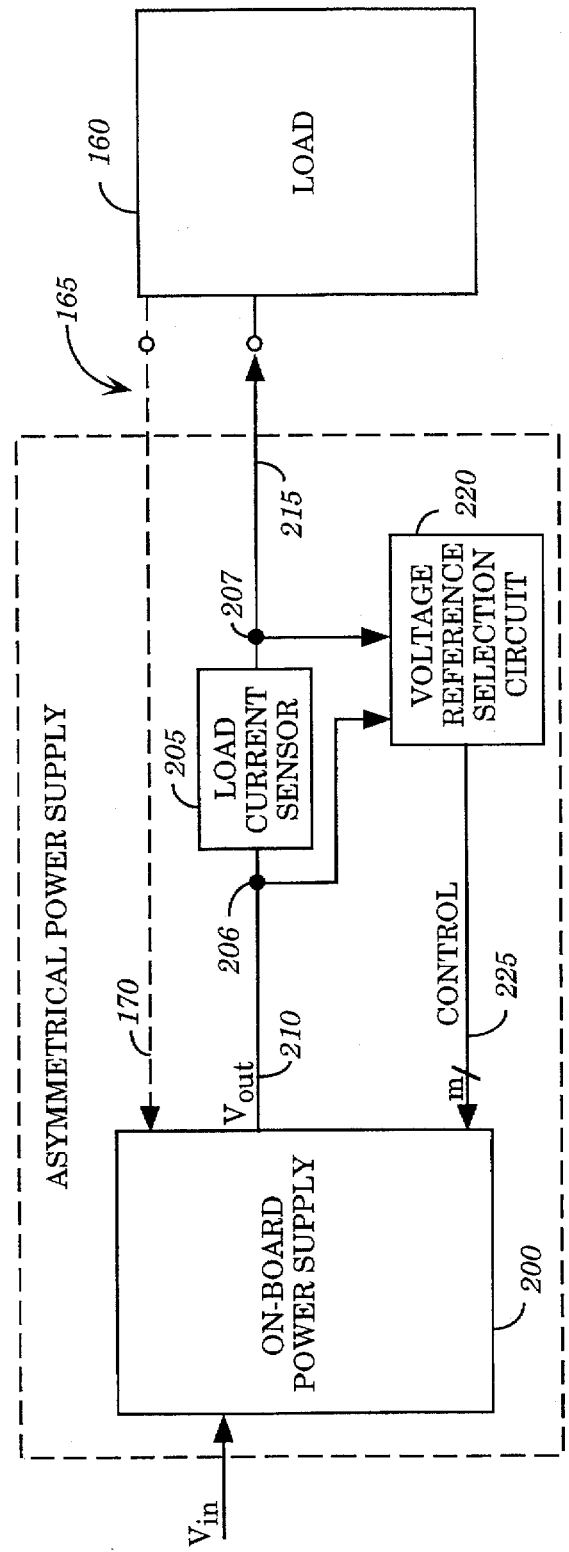
FIG. 3 is a block diagram of the asymmetric power supply coupled to a load.

Referring now to FIG. 3, a block diagram of the asymmetrical power supply 155 coupled to the load 160 is shown. The asymmetrical power supply 155 includes an on-board power supply 200 featuring a regulator and regulator control circuitry (not shown), a load current sensor 205 and a voltage reference selection circuit 220. Optionally, as denoted by a dashed line, a sense line 170 may be coupled between the load 160 and the on-board power supply 200 in order to measure the voltage at the load 160. The sense line 170, however, is not required to practice the invention.

The power supply 200 receives a DC input voltage ("$V_{in}$") and produces a DC set voltage "$V_{out}$" through power line 165. Preferably, the load current sensor 205 is coupled in series with the power line 165 between the power supply 200 and the load 160 although it is contemplated that it may be implemented to receive input voltage applied to the on-board power supply 200. The load current sensor 205 may be a resistor (not shown) having a low resistance ("R") and resistive tolerance value (e.g., a five milli-ohm ("5 mΩ") resistor with one percent (1%) tolerance). In this embodiment, a first connector 206 of the load current sensor 205 is coupled to a first segment 210 of the power line 165 while a second connector 207 of the load current sensor 205 is coupled to a second segment 215 of the power line 165. The voltage reference selection circuit 220 is coupled to both the first and second connectors 206 and 207 in order to monitor the magnitude of a voltage drop across the load current sensor 205 predicated on the load current supplied to the load 160 via power line 165.

Upon the voltage reference selection circuit 220 detecting that there exists no more than a selected minimum voltage drop across the load current sensor 205, which is normally due to the load current being less than or equal to a selected ampere level "$i_{low}$" ($i_{low} \geq i_{min}$), the voltage reference selection circuit 220 causes the on-board power supply 200 to adjust its DC set voltage to approach its maximum threshold voltage "$V_{max}$" by outputting a control signal through "m" control line(s) 225 (where "m"$\geq 1$). In the event that the voltage reference selection circuit 220 detects that there is a significant voltage drop, normally due to the load current greater than or equal to a predetermined ampere level "$i_{high}$" ($i_{max} \geq i_{high} > i_{low} \geq i_{min}$) propagating across the load current sensor 205, the voltage reference selection circuit 220 causes the on-board power supply 200 to adjust its DC set voltage to approach its minimum threshold voltage "$V_{min}$". As a result, the DC set voltage is increased or decreased in order to provide a larger voltage margin to account for changes in load current.

Figure 4:
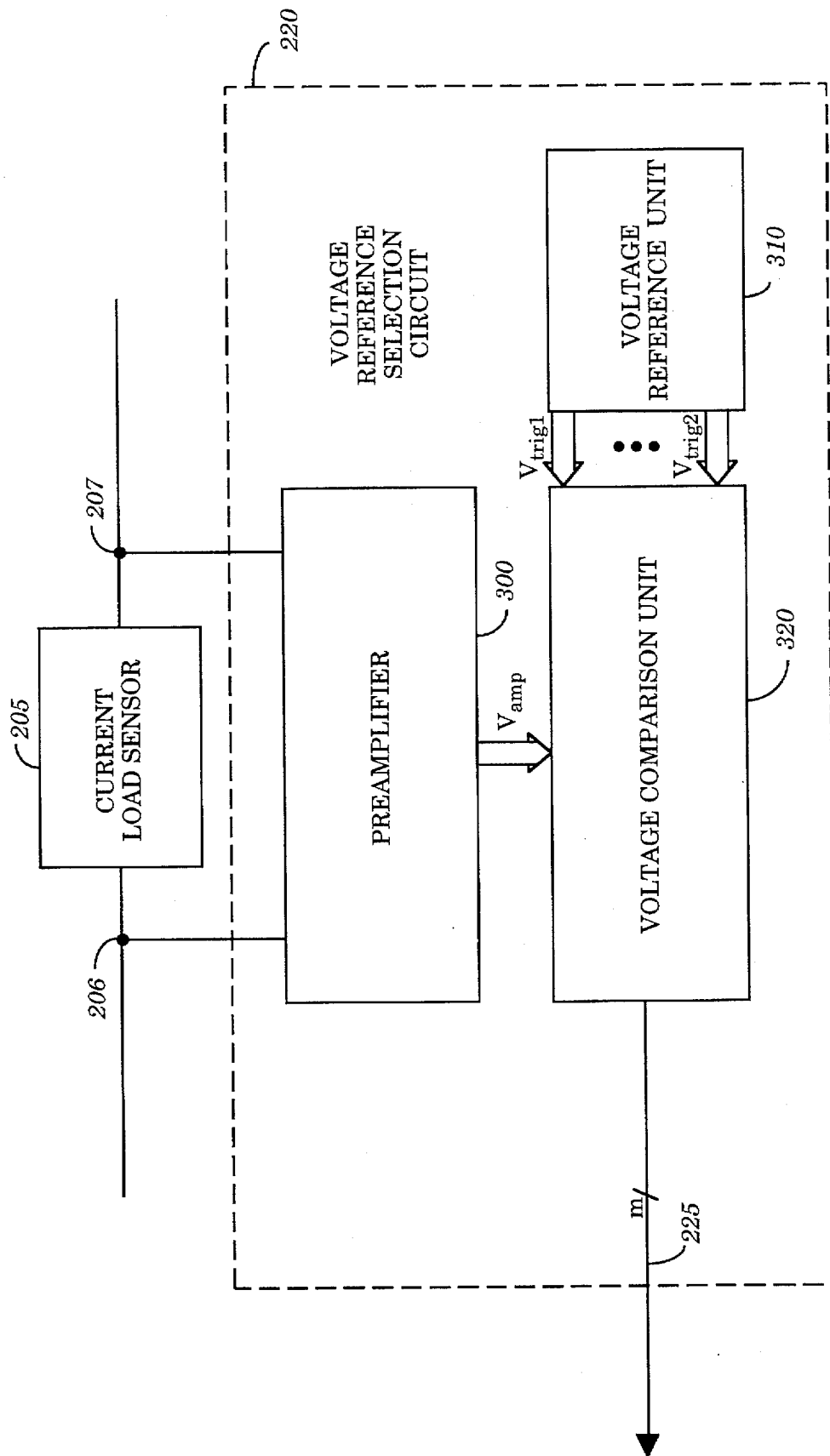
FIG. 4 is a block diagram of the voltage reference selection circuit of FIG. 3.

Referring to FIG. 4, a more detailed block diagram of the voltage reference selection circuit 220 of FIG. 3 is shown. The voltage reference selection circuit 220 includes a preamplifier 300, a voltage reference unit 310 and a voltage comparison unit 320. The preamplifier 300 is a typical "differential-to-single ended" voltage preamplifier coupled to both connectors 206 and 207 of the current load sensor 205. The preamplifier 300 receives as input a small voltage measurement, normally a few milli-volts not referenced to ground, and outputs an amplified voltage ("$V_{amp}$") referenced to ground. The preamplifier 300 is configured with a sufficiently high gain ("G") so that the amplified voltage for currents within the "$i_{max}$" to "$i_{min}$" range result in a workable voltage.

The preamplifier 300 outputs the amplified voltage into the voltage comparator unit 320. The amplified voltage is compared to a plurality of reference trigger voltages provided by the voltage reference unit 310. These reference trigger voltages may be set according to the following equation:

First reference trigger voltage ("$V_{trig1}$")=$G \times R \times i_{high}$,
where "$i_{high}$" is the current that triggers the asymmetric power supply to adjust its DC set voltage closer to $V_{min}$.

Second reference trigger voltage ("$V_{trig2}$")=$G \times R \times i_{low}$,
where "$i_{low}$" is the current that triggers the asymmetric power supply to adjust its DC set voltage closer to $V_{max}$.

For the embodiment of FIG. 4, if the amplified voltage is greater than the first reference trigger voltage, the voltage reference selection circuit 220 detects that the load current is greater than $i_{high}$. In response, the voltage comparator unit 320 transmits a control signal to the power supply via control line(s) 225 to signal the power supply, namely the regulator control circuitry, to decrease its DC set voltage. This will provide a greater voltage margin between the newly adjusted DC set voltage and $V_{max}$ to account for a voltage increase in the more likely event of a sudden decrease in load current. Conversely, if the amplified voltage is less than the second reference trigger voltage, the voltage reference selection circuit 220 detects that the load current is less than $i_{low}$. This prompts the voltage comparator unit 320 to transmit another control signal to the power supply via control line(s) 225 to increase its DC set voltage and produce a greater voltage margin between the adjusted DC set voltage and $V_{min}$.

Although only two reference trigger voltages are used in this embodiment, it is contemplated that any number of reference trigger voltages can be used. Moreover, the voltage reference selection circuit may be configured to receive "$V_{trig1}$" and "$V_{trig2}$" from an external source. Furthermore, the voltage reference selection circuit may be configured to instantaneously adjust the DC set voltage in accordance with a change in load current or adjust the DC set voltage in an integrated fashion to avoid errant adjustments through prior verification that the rate of load current has deviated for over a prolonged period of time.

Figure 5:
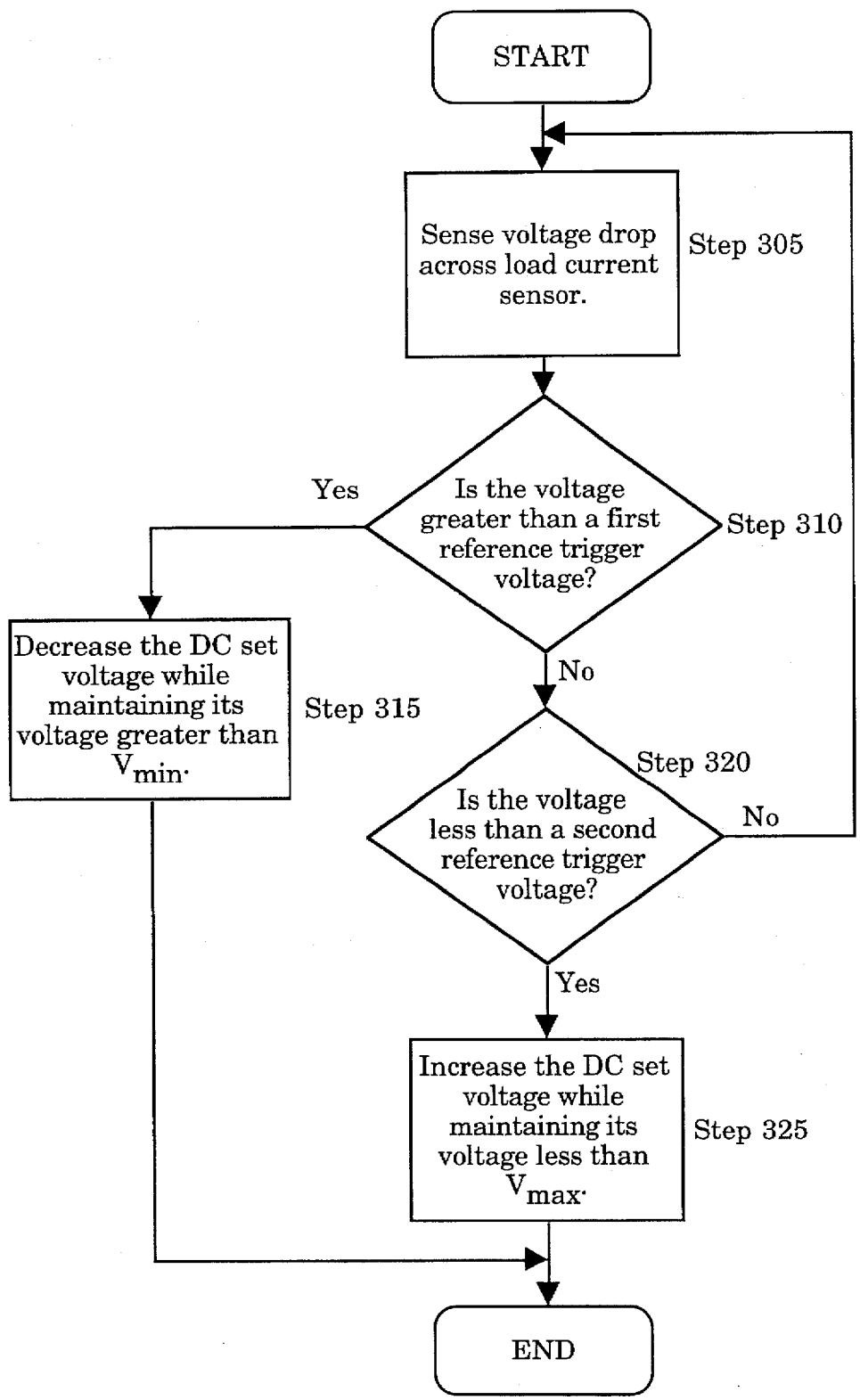
FIG. 5 is a flowchart illustrating the operations performed by the asymmetric power supply.

Referring to FIG. 5, a flowchart illustrating the operating of the present invention is shown. In Step 305, the voltage drop across the load current sensor is measured in order to implicitly determine the load current applied to the load. Next, in Step 310, the voltage drop measured across the load current sensor is compared to a first reference trigger voltage. The first reference trigger voltage is pre-selected in order to determine if the load current is above a predetermined ampere value. If the voltage drop is greater than the first reference trigger voltage, the on-board power supply decreases its DC set voltage to provide a greater voltage margin between $V_{out}$ and $V_{max}$ (Step 315). In the event that the voltage is less than the first reference trigger voltage, the voltage is compared with a second reference trigger voltage. The second reference trigger voltage is pre-selected in order to determine if the load current is below another predetermined ampere value. If the voltage is less than the second reference trigger voltage, the DC set voltage is increased thereby increasing the voltage margin between $V_{out}$ and $V_{min}$ (Step 325). If the voltage is greater than the second reference trigger voltage, the DC set voltage is not adjusted and the voltage is measured again across the load current sensor returning back to Step 305. It is contemplated that there can be a number of voltage checks of the voltage drop across the load current sensor in order to adjust the voltage margin for even slight changes in load current transmitted to the load and such checks can include subroutine checks to avoid errors in offsetting the DC set voltage.

In the foregoing specification the invention has been described with reference to specific exemplary embodiments thereof. It will, however, be evident that various modifications and changes may be made thereto without departing from the broader spirit and scope of the invention as set forth in the claims which follow.

What is claimed is:

1. An asymmetric power supply providing an operating voltage ranging between a maximum voltage and a minimum voltage, the asymmetric power supply comprising:
    a power supply;
    a load current sensor to be coupled to said power supply; and
    a voltage reference selection circuit to be coupled to said load current sensor and said power supply, said voltage reference selection circuit reducing the operating voltage to a selected, positive voltage upon detecting that a voltage drop across said load current sensor is greater than a first reference trigger voltage being a predetermined voltage less than the maximum voltage.

2. The asymmetric power supply according to claim 1, wherein said power supply includes a regulator and regulator control circuitry.

3. The asymmetric power supply according to claim 1, wherein said load current sensor includes a resistor.

4. The asymmetric power supply according to claim 1, wherein said operating voltage is reduced to produce a larger voltage margin between said operating voltage and the maximum voltage.

5. The asymmetric power supply according to claim 1, wherein said first reference trigger voltage is less than or equal to said maximum voltage.

6. The asymmetric power supply according to claim 1, wherein said voltage reference selection circuit further increasing said operating voltage upon detecting that said voltage drop is less than a second reference trigger voltage in order to produce a larger voltage margin between said operating voltage and the minimum voltage.

7. The asymmetric power supply according to claim 6, wherein said second reference trigger voltage is greater than or equal to said minimum voltage.

8. The asymmetric power supply according to claim 1, wherein said voltage reference selection circuit includes a preamplifier, a voltage reference unit and a voltage comparison unit.

9. An asymmetric power supply providing an operating voltage ranging between a maximum voltage and a minimum voltage to a load, the asymmetric power supply comprising:
    power means for supplying the operating voltage to the load;
    sensing means for sensing an amount of load current applied to the load, said sensing means being coupled between said power means and the load; and
    referencing means for measuring the amount load current and actively adjusting the operating voltage in response to the amount of load current measured, said referencing means, coupled to said sensing means and said power means, reducing the operating voltage if said load current is at least equal to a first predetermined ampere value and increases the operating voltage if said load current is at most equal to a second predetermined ampere value.

10. A computer system comprising:
    an external power supply which receives alternating current power and produces direct current power; and
    a motherboard coupled to said external power supply to receive at least said direct current power, said motherboard including
    a microprocessor,
    an on-board power supply providing an operating voltage to said microprocessor, wherein said operating voltage ranges between a maximum voltage and a minimum voltage,
    a load current sensor coupled to said on-board power supply and said microprocessor, and
    a voltage reference selection circuit coupled to said load current sensor and said on-board power supply, said voltage reference selection circuit measures a voltage drop across said load current sensor and actively offsets the operating voltage in response to an amount of the voltage drop.

11. The computer system according to claim 10, wherein said on-board power supply of said motherboard includes a regulator and regulator control circuitry.

12. The computer system according to claim 10, wherein said load current sensor includes a resistor.

13. The computer system according to claim 10, wherein said voltage reference selection circuit reduces said operating voltage upon detecting that said voltage drop is greater than a first reference trigger voltage in order to produce a larger voltage margin between said operating voltage and the minimum voltage.

14. The computer system according to claim 13, wherein said first reference trigger voltage is less than or equal to said maximum voltage.

15. The computer system according to claim 13, wherein said voltage reference selection circuit increases said operating voltage upon detecting that said voltage drop is less than a second reference trigger voltage.

16. The computer system according to claim 15, wherein said second reference trigger voltage is greater than or equal to said minimum voltage in order to produce a larger voltage margin between said operating voltage and the maximum voltage.

17. The computer system according to claim 10, wherein said voltage reference selection circuit includes a preamplifier, a voltage reference unit and a voltage comparison unit.

18. A computer system comprising
external power means for providing direct current power; and
board means, coupled to said external power means, for providing the functionality of the computer system, said board means includes
processor means for executing instructions,
power means for supplying an operating voltage to said processor means,
sensing means for sensing an amount of load current applied to said processor means, said sensing means being coupled to said power means and said processor means, and
referencing means for measuring the amount load current, for adjusting the operating voltage in response to the amount of load current measured, for reducing the operating voltage if said load current is at least equal to a first predetermined ampere value and for increasing the operating voltage if said load current is at most equal to a second predetermined ampere value, said referencing means being coupled to said sensing means.

19. The computer system according to claim 18, wherein said power means includes a regulator and regulator control circuitry.

20. The computer system according to claim 18, wherein said sensing means includes a resistor.

21. The computer system according to claim 18, wherein said first predetermined ampere value is greater than said second predetermined ampere value.

22. The computer system according to claim 18, wherein said referencing means includes a preamplifier, a voltage reference unit and a voltage comparison unit.

23. A method for offsetting a direct current (DC) set voltage applied to a load, the method comprising the steps of:
sensing a voltage drop across a load current sensor coupled to the load;
determining whether said voltage drop is greater than a first reference trigger voltage; and
decreasing the DC set voltage to a first adjusted DC set voltage if said voltage drop is greater than said first reference trigger voltage.

24. The method according to claim 23, wherein the determining step further includes the steps of
determining whether said voltage drop is less than a second reference trigger voltage if said voltage drop is less than said first reference trigger voltage;
increasing the DC set voltage to a second adjusted DC set voltage if said voltage drop is less than said second reference trigger voltage; and
returning to said sensing step if said voltage drop is greater than said second reference trigger voltage.

25. The method according to claim 23, wherein prior to the sensing step, the method further comprising the step of setting at least the first reference trigger voltage.

26. The method according to claim 23 further comprising the steps of:
determining whether said voltage drop is less than a second reference trigger voltage if said voltage drop is less than said first reference trigger voltage; and
increasing the DC set voltage to a second adjusted DC set voltage if said voltage drop is less than said second reference trigger voltage.

27. The method according to claim 26 further comprising the step of returning to said sensing step if said voltage drop is less than the first reference trigger voltage and greater than the second reference trigger voltage.

28. An asymmetric power supply comprising:
a power supply;
a load current sensor to be coupled to said power supply; and
a voltage reference selection circuit to be coupled to said load current sensor and said power supply, said voltage reference selection circuit reducing an operating voltage provided by said power supply upon detecting that a voltage drop over the load current sensor is greater than a first reference trigger voltage and alternatively increasing said operating voltage upon detecting that said voltage drop is less than a second reference trigger voltage.

29. The asymmetric power supply according to claim 28, wherein said voltage reference selection circuit further decreasing said operating voltage upon detecting that said voltage drop is greater than or equal to another reference trigger voltage in order to increase the voltage margin between said operating voltage and a maximum voltage provided by the asymmetric power supply.

30. An asymmetric power supply comprising:
a power supply;
a load current sensor to be coupled to the power supply; and
a voltage reference selection circuit to be coupled to the load current sensor and the power supply, the voltage reference selection circuit increasing an operating voltage provided by the power supply upon detecting that a voltage drop across the load current sensor is less than a reference trigger voltage.

* * * * *